United States Patent [19]

Gellert et al.

[11] Patent Number: 5,441,197
[45] Date of Patent: Aug. 15, 1995

[54] METHOD OF MANUFACTURING INJECTION MOLDING MANIFOLD HAVING A MELT PASSAGE WITH AN ELBOW

[76] Inventors: Jobst U. Gellert, 7A Prince Street, Georgetown, Ontario, Canada, L7G 2X1; Randy Zuest, 115 Town Line, Milton, Ontario, Canada, L9T 2X1; Hans Guenther, 371 Delrex Boulevard, Georgetown, Ontario, Canada, L7G 4H6

[21] Appl. No.: 373,444

[22] Filed: Jan. 17, 1995

[51] Int. Cl.⁶ ..................... B23K 1/008; B23K 31/02
[52] U.S. Cl. ................. 228/248.1; 228/182; 228/49.1
[58] Field of Search ............. 228/161, 170, 182, 221, 228/248.1, 49.1; 425/549; 264/328.15; 29/890.052, 890.054, 890.08

[56] References Cited

U.S. PATENT DOCUMENTS

| | | |
|---|---|---|
| 4,424,622 | 1/1984 | Krause .................. 425/566 |
| 4,609,138 | 9/1986 | Harrison ................ 228/161 |
| 4,648,546 | 3/1987 | Gellert ................. 228/161 |

FOREIGN PATENT DOCUMENTS 0523549  1/1993  European Pat. Off. .

*Primary Examiner*—Samuel M. Heinrich
*Attorney, Agent, or Firm*—Dalesman & Company

[57] ABSTRACT

A method of making an injection molding melt distribution manifold wherein the melt passage branches through a number of elbows leading to different gates. Each elbow is preformed in a cylindrical plug which fits in a bore in an outer end of the manifold in alignment with a lateral portion of the melt channel. A brazing hole with an upward mouth is drilled in the outer surface of the plug and nickel alloy brazing powder is poured into it. After insertion into the bore in the manifold, the plug is rotated with a suitable tool to a predetermined position with the mouth of the brazing hole pointed downward. The manifold is then heated in a vacuum furnace to integrally braze the plugs in place simultaneously with brazing an electrical heating element in a channel in the manifold. The melt passage is then completed by drilling an outlet bore from the front face of the manifold to the outlet of each elbow.

4 Claims, 3 Drawing Sheets

METHOD OF MANUFACTURING INJECTION MOLDING MANIFOLD HAVING A MELT PASSAGE WITH AN ELBOW

BACKGROUND OF THE INVENTION

This invention relates generally to injection molding and more particularly to a method of manufacturing an injection molding heated melt distribution manifold having a melt passage extending therethrough with a number of elbows.

Making multi-cavity injection molding systems having a steel melt distribution manifold with an integral electrical heating element in which the melt passage branches to a number of outlets is well known in the art. These manifolds are made with the melt passage having at least one lateral portion branching out to a pair of elbows leading to outlet bores extending to the front face of the manifold. Previously, these manifolds having a melt passage with elbows have been made by cross drilling bores and plugging them off and by machining matching grooves in two plates and brazing them together. Both of these methods are seen in U.S. Pat. No. 4,648,546 to Gellert which issued Mar. 10, 1987. It is also known to preform each elbow in a plug and then simultaneously braze the heating element in a channel and the plug in a bore extending from an end of the manifold. This is shown in U.S. Pat. No. 4,609,138 to Harrison which issued Sep. 2, 1986. Similarly, it is shown in European Patent Publication Number 0 523 549 A2 to Gellert et al. published Jan. 20, 1993 to preform melt passage elbows in inserts or plugs removably seated in openings extending from the front face of a manifold.

While the manifolds made by these previous methods are satisfactory for many applications, they have the disadvantage that they are too time consuming and costly.

SUMMARY OF THE INVENTION

Accordingly, it is an object of the present invention to at least partially overcome the disadvantages of the prior art by providing a method of manufacturing an injection molding manifold wherein an ample quantity of brazing material is provided to bond preformed plugs in place as integral parts of the manifold.

To this end, in one of its aspects the invention provides a method of making an injection molding manifold with a melt passage extending therethrough from a rear face to a front face, the melt passage having at least one lateral portion branching to a plurality of elbows, each elbow in the melt passage having an inlet extending from the at least one lateral portion of the melt passage and an outlet extending to an outlet bore extending frontwardly to the front face, the method including preforming a plurality of plugs, each having an inner end and a generally cylindrical outer surface with each elbow extending therebetween, integrally brazing each plug in a bore extending inwardly from an end of the manifold with the inlet in alignment with the lateral portion of the melt passage, and integrally brazing an electrical heating element into a matching channel in one of the rear and front faces of the manifold by setting the heating element into the channel, putting a highly conductive brazing material in the channel along the heating element, placing the manifold and heating element in a vacuum furnace with said one of the rear and front faces of the manifold upward, and heating the manifold and heating element in the vacuum furnace to a predetermined temperature under a partial vacuum according to a predetermined cycle whereby each plug is integrally brazed in place in the bore and the brazing material melts and flows around the heating element in the channel to integrally braze the heating element into the channel, having the improvement including forming each plug with a brazing hole having an open mouth on the cylindrical outer surface thereof and an outer end with a tool engagement opening therein, orienting each plug with the mouth of the brazing hole facing upward and putting a predetermined quantity of brazing material into the hole, inserting each plug into the respective bore extending inwardly from an end of the manifold, inserting a tool into the tool engagement opening in the outer end of each plug and rotating the plug to a predetermined brazing position with the mouth of the brazing hole facing downward, and after integrally brazing the plugs in the bores in the vacuum furnace, machining an outlet bore extending from the front face of the manifold to the outlet of each plug.

Further objects and advantages of the invention will appear from the following description taken together with the accompanying drawings.

DETAILED DESCRIPTION OF THE INVENTION

Figure 1:
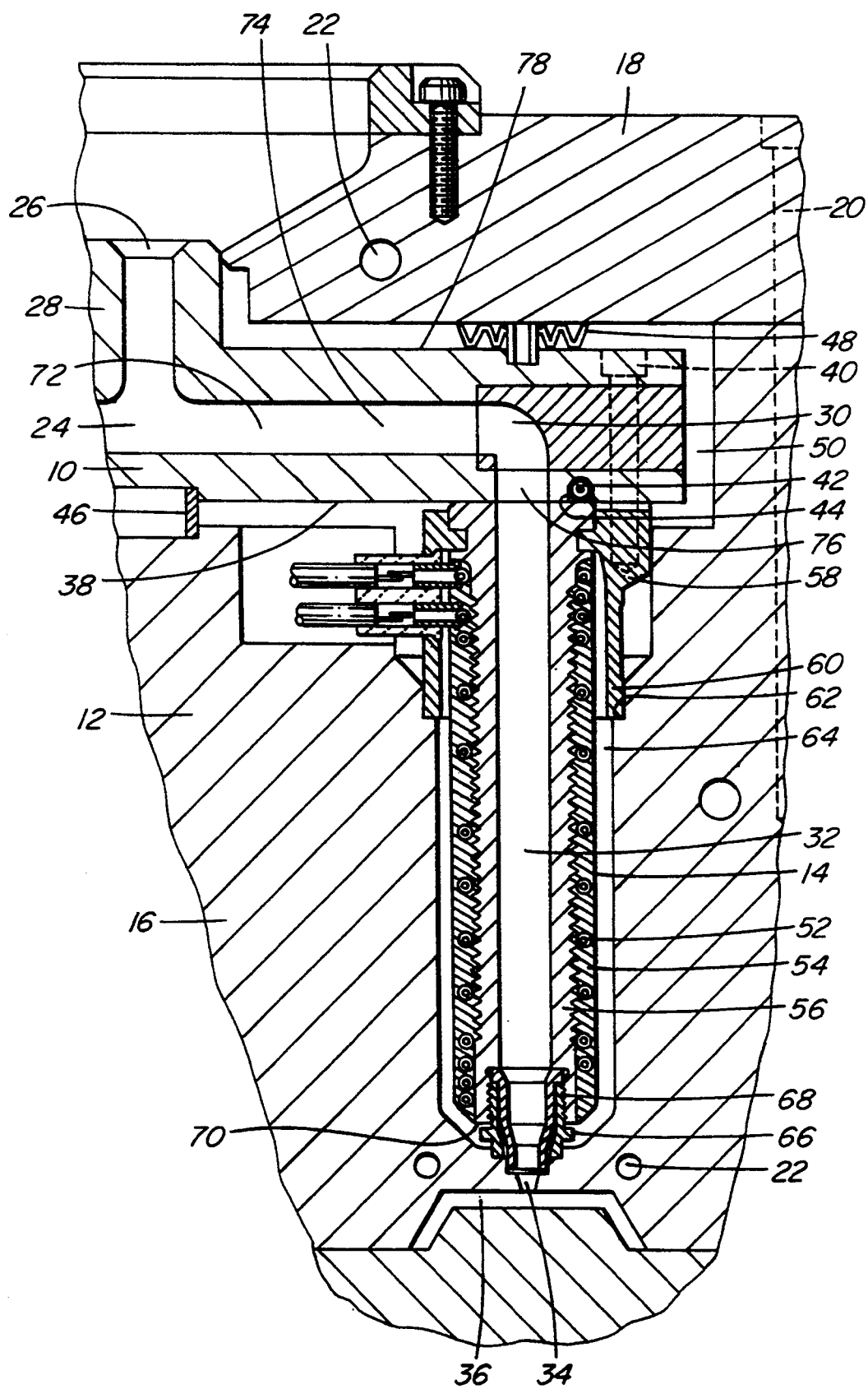
FIG. 1 is a sectional view showing a portion of a multi-cavity injection molding system with a melt distribution manifold made according to a preferred embodiment of the invention.

Reference is first made to FIG. 1 which shows how a melt distribution manifold 10 made according to a preferred embodiment of the invention is normally mounted in a mold 12 to interconnect a number of spaced nozzles 14 to provide a multi-cavity injection molding system. While the mold 12 usually has a greater number of plates depending upon the configuration, in this case only a cavity plate 16 and a back plate 18 which are secured together by bolts 20 are shown for ease of illustration. The mold 12 is cooled by pumping cooling water through cooling conduits 22 in the cavity plate 16 and back plate 18.

Pressurized plastic melt is conveyed through a melt passage 24 from a central inlet 26 in a cylindrical inlet portion 28 of the manifold 10. The melt passage 24 branches in the manifold 10 and around an elbow 30 and through a central bore 32 in each nozzle 14 to a gate 34 leading to each cavity 36. Each nozzle 14 is secured in proper alignment to the front face 38 of the manifold 10 by screws 40 extending through the manifold 10 into the nozzle 14. The manifold 10 is heated by an electrical heating element 42 integrally brazed in a channel 44 extending around its front face 38 in a predetermined configuration. The manifold 10 is securely mounted between the cavity plate 16 and the back plate 18 by a central locating ring 46 and insulative and resilient spacer members 48. This provides an insulative air space 50 between the manifold 10 and the surrounding mold 12.

Each elongated nozzle 14 also has an electrical heating element 52. It is cast into an aluminum or copper alloy conductive portion 54 extending around a steel hollow core 56. Each nozzle 14 has an outer collar 58 with an insulative flange portion 60 seated on a circular seat 62 extending around an opening in the cavity plate 16. This similarly provides an insulative air space 64 between the heated nozzle 14 and the surrounding cooled cavity plate 16. While in this case, the melt passage 24 extends centrally through a two-piece nozzle seal 66 screwed into a threaded seat 68 in the front end 70 of the nozzle, in other applications a variety of other gating configurations can be used. As can be seen, each of the different branches 72 of the melt passage 24 in the manifold 10 extends outwardly through a lateral portion 74, around the elbow 30, and frontwardly through an outlet bore 76 to the front face 38 in alignment with the central melt bore 32 through the nozzle 14.

Figure 2:
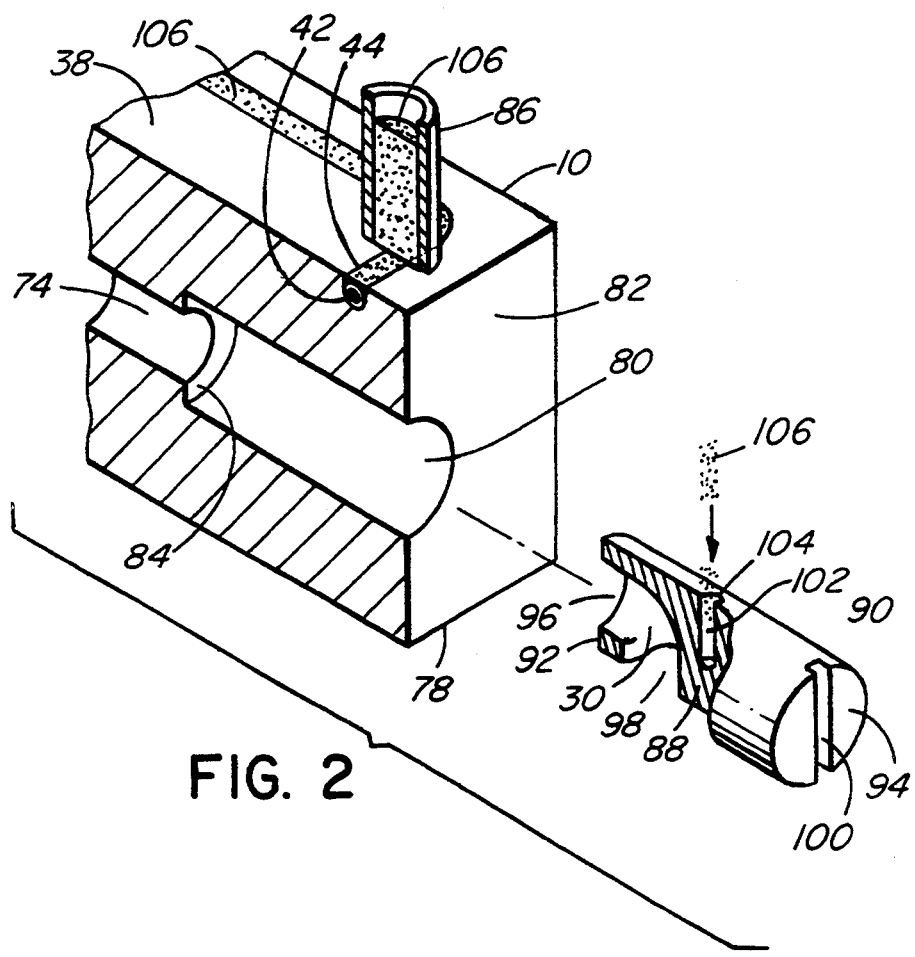
FIG. 2 is a cut-away isometric view showing a preformed plug in position for insertion into a bore in the manifold.
Figure 3:
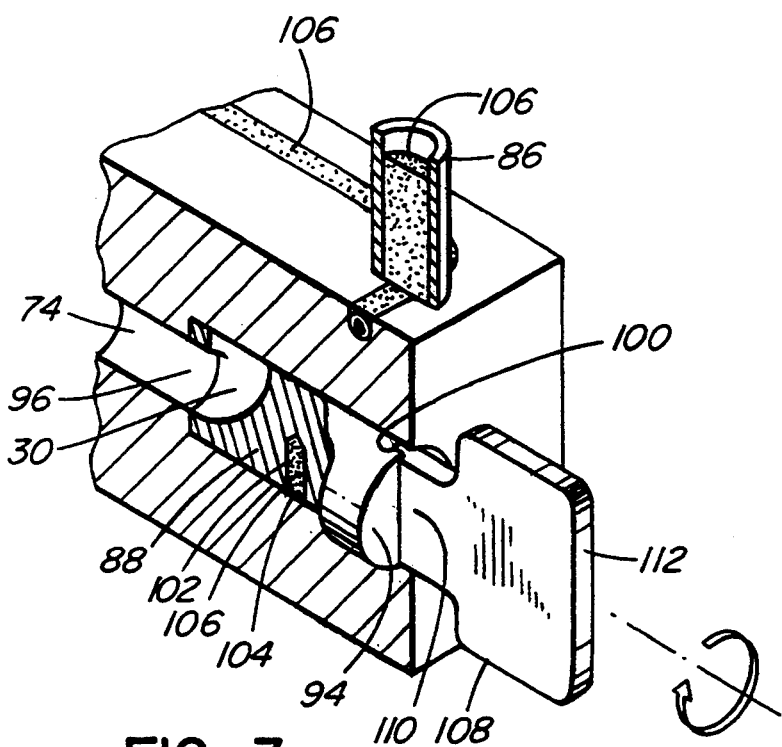
FIG. 3 is a similar view showing the plug seated in the bore following rotation.

Reference is now made to FIGS. 2–5 in describing the method of making the manifold 10 with this melt passage 24 according to a preferred embodiment of the invention. In order to avoid confusion, it should be noted the manifold 10 is shown inverted in these Figures with its front face 38 upward and its rear face 78 downward. Referring first to FIG. 2, the manifold 10 is machined of a suitable material such as H13 tool steel with a cylindrical bore 80 extending inwardly from each end 82 of the manifold 10 in alignment with the lateral portion 74 of the melt passage 24. The cylindrical bore 80 is larger in diameter than the melt passage 24 to form a circular shoulder 84 where they meet. The manifold is made with the heating element channel 44 having a predetermined configuration in its front face 38. The electrical heating element 42 is seated in the channel 44 and one or more cylindrical filler tubes 86 are tack welded to the front face 38 of the manifold 10 in alignment with the channel 44.

A number of plugs 88 are preformed of a suitable material such as H13 tool steel. Each plug 88 has a cylindrical outer surface 90 extending from an inner end 92 to an outer end 94 to fit in the cylindrical bore 80 in the end 82 of the manifold 10. The plugs 88 are machined or cast with the elbow 30 extending therethrough from an inlet 96 at the inner end 92 to an outlet 98 on the outer surface 90. Each plug 88 is made with a tool engagement opening 100 in its outer end 94. While the tool engagement opening is shown as a slot 100, in other embodiments it can be made of other shapes. Each plug 88 is also made with a brazing powder reservoir or hole 102 of a predetermined size in its outer surface 90. In this embodiment, the brazing powder hole 102 is drilled radially inward from the outer surface 90, but in other embodiments it can have other suitable shapes such as a slot. In this case, the brazing powder hole 102 is midway between the ends 92, 94 of the plug 88 and its mouth 104 is opposite to the outlet 98 of the elbow 30.

Figure 5:
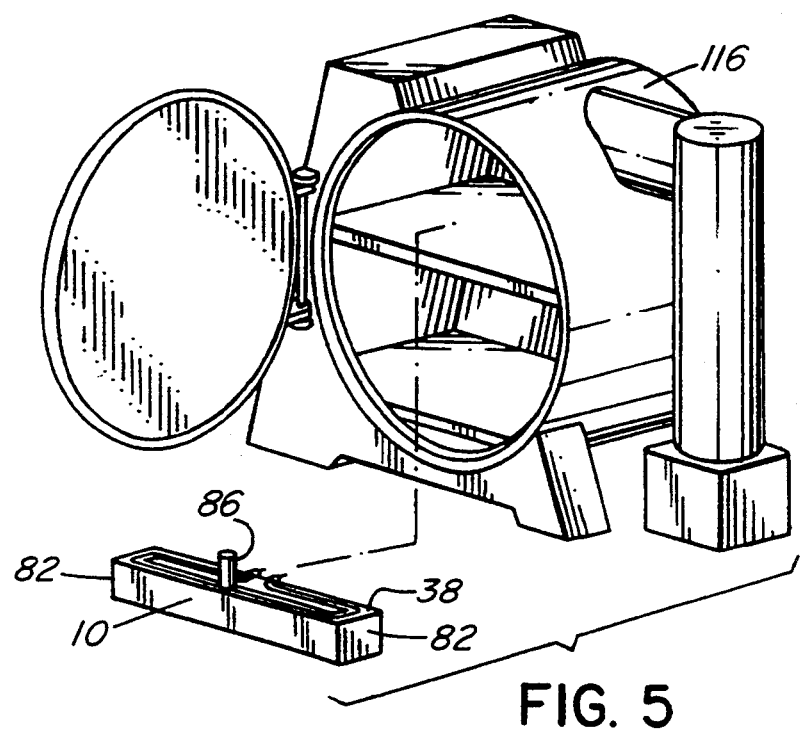
FIG. 5 shows a manifold in position for insertion into a vacuum furnace for brazing.
Figure 4:
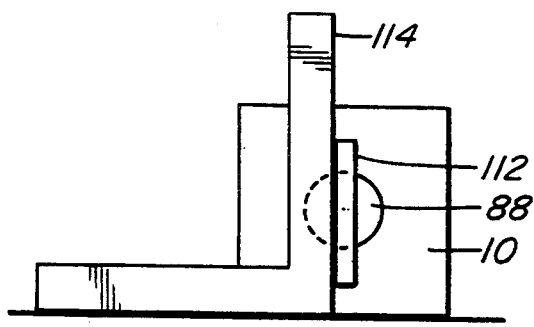
FIG. 4 shows how the plug is accurately aligned using a square.
Figure 6:
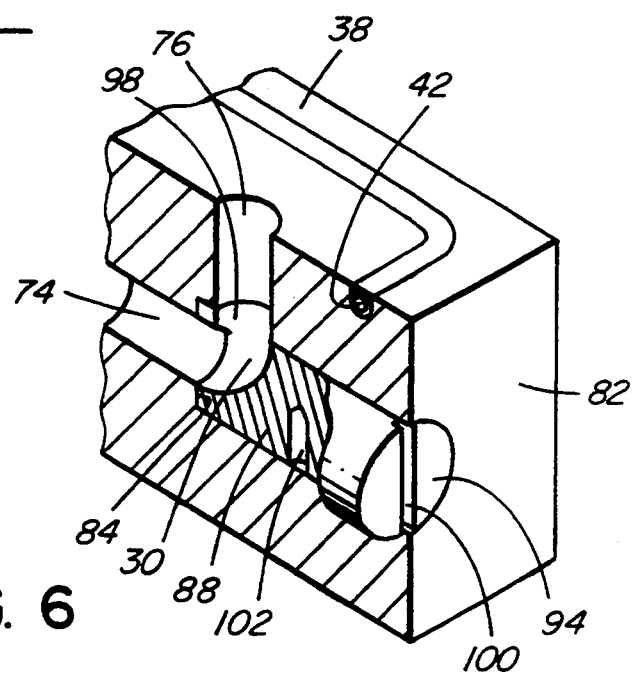
FIG. 6 is a cut-away isometric view of a portion of a completed manifold.

As seen in FIG. 2, the plug 88 is oriented with the mouth 104 of the brazing powder hole 102 facing upward and a predetermined quantity of brazing material 106 is poured into the brazing powder hole 102. Brazing material 106 is also poured over the heating element 42 in the channel 44 in the manifold 10 and into the filler tubes 86. In this embodiment, the brazing material 106 is a nickel alloy powder but in other embodiments other suitable heat conductive materials can be used and it can be in a paste rather than a powder. After the brazing material 106 is poured into the brazing powder hole 102, the plug is inserted into the respective cylindrical bore 80 in the end 82 of the manifold 10 with its inner end 92 abutting against the circular shoulder 84. Then, a suitable tool 108 is used to rotate the plug 88 to a predetermined position in the bore 80 with the mouth 104 of the brazing powder hole 102 facing downward. It is essential that the elbow 30 in the plug 88 is in alignment with the rest of the melt passage 24. Thus, while the inlet 96 to the elbow 30 is located centrally in the plug 88 to be aligned with the lateral portion 74 of the melt passage 24, the length of the elbow 30 in the plug 88 and the position to which it is rotated must be determined exactly to also ensure proper alignment of the outlet 98 of the elbow 30. In this embodiment, the tool 108 has a blade 110 which fits into the slot 100 in the outer end 94 of the plug 88 and a flat handle 112 which facilitates its position being accurately determined using a square 114 or other device, as seen in FIG. 4. Of course, other suitable tools and arrangements can be used to rotate each plug 88 to the proper position. The manifold 10 sitting in the upright position shown is then inserted into a vacuum furnace 116 and heated according to a controlled cycle to a temperature of about 1950° F. which is above the melting point of the nickel alloy brazing powder 106. As the furnace 116 is gradually heated, it is evacuated to a relatively high vacuum to remove substantially all of the oxygen. The vacuum is then reduced by partially backfilling the furnace 116 with an inert gas such as argon or nitrogen to avoid sputtering. This melts the brazing powder 106 which flows downwardly out of the open mouth 104 of the brazing powder hole 102 and by capillary action around between the outer surface 90 of the plug 88 and the surrounding bore 80. The brazing powder 106 in the channel 44 and filler tubes 86 similarly melts and flows down to cover the heating element 42. The controlled cycle of the vacuum furnace 116 is then completed by gradually cooling it down with a supply of inert gas such as nitrogen to integrally braze the plugs 88 in the bores 80 and the heating element 42 in the channel 44. Brazing the nickel alloy in this way in a vacuum furnace 116 produces a uniform metallurgical bonding between the nickel alloy and the steel to provide even thermal flow away from the heating element 42 and into the plugs 88. After removal from the vacuum furnace 116, the manifold 10 is machined to remove the filler tubes 86 and to provide a clean finish. As seen in FIG. 5, an outlet bore 76 is then drilled from the front face 38 of the manifold 10 to the outlet 98 of the elbow 30 in each plug 88. As mentioned above, each plug 88 is accurately positioned in the bore 80 longitudinally by abutting against the shoulder 84 and angularly by the tool 108 to ensure the outlet bore 76 is drilled in alignment with the outlet 98 of the respective elbow 30.

In use, after assembly and installation in a mold 12 as shown in FIG. 1, electrical power is applied to the heating element 42 in the manifold 10 and to the heating elements 52 in the nozzles 14 to heat them to a predetermined operating temperature. Pressurized melt is applied from a molding machine (not shown) to the central inlet 26 of the melt passage 24 according to a predetermined cycle. The melt branches and flows outwardly through each lateral portion 74 and around the aligned elbow 30 to the central bore 32 of the respective nozzle 14. It continues through the aligned nozzle seal 66 and gate 34 into a cavity 36. After the cavities 36 are filled and a suitable packing and cooling period has expired, the injection pressure is released and the melt conveying system is decompressed to avoid stringing through the open gates 34. The mold 12 is then opened to eject the molded products. After ejection, the mold 12 is closed and the cycle is repeated continuously with a cycle time dependent upon the size of the cavities 34 and the type of material being molded.

While the description of the method of making injection molding melt distribution manifolds having a melt passage extending through an elbow has been given with respect to a preferred embodiment, it will be evident that various other modifications are possible without departing from the scope of the invention as understood by those skilled in the art and as defined in the following claims. For instance, while the manifold 10 is shown being made with a generally rectangular shape having only two ends 82, in other applications it can have a more complex configuration with more ends 82. Also, while the heating element channel 44 is shown formed on the front face 38 of the manifold 10, in other embodiments it can be provided on the rear face 78 of the manifold 10 by drilling the brazing hole 102 on the same side of the plug 88 as the outlet 90 of the elbow 30 and loading the manifold 10 the other way up in the vacuum furnace 116.

The embodiments of the invention in which an exclusive property or privilege is claimed is defined as follows:

1. In a method of making an injection molding manifold with a melt passage extending therethrough from a rear face to a front face, the melt passage having at least one lateral portion branching to a plurality of elbows, each elbow in the melt passage having an inlet extending from the at least one lateral portion of the melt passage and an outlet extending to an outlet bore extending frontwardly to the front face, the method including preforming a plurality of plugs, each having an inner end and a generally cylindrical outer surface with each elbow extending therebetween, integrally brazing each plug in a bore extending inwardly from an end of the manifold with the inlet in alignment with the lateral portion of the melt passage, and integrally brazing an electrical heating element into a matching channel in one of the rear and front faces of the manifold by setting the heating element into the channel, putting a highly conductive brazing material in the channel along the heating element, placing the manifold and heating element in a vacuum furnace with said one of the rear and front faces of the manifold upward, and heating the manifold and heating element in the vacuum furnace to a predetermined temperature under a partial vacuum according to a predetermined cycle whereby each plug is integrally brazed in place in the bore and the brazing material melts and flows around the heating element in the channel to integrally braze the heating element into the channel, having the improvement including;

(a) forming each plug with a brazing hole having an open mouth on the cylindrical outer surface thereof and an outer end with a tool engagement opening therein, (b) orienting each plug with the mouth of the brazing hole facing upward and putting a predetermined quantity of brazing material into the hole, (c) inserting each plug into the respective bore extending inwardly from an end of the manifold, (d) inserting a tool into the tool engagement opening in the outer end of each plug and rotating the plug to a predetermined brazing position with the mouth of the brazing hole facing downward, and (e) after integrally brazing the plugs in the bores in the vacuum furnace, machining an outlet bore extending from the front face of the manifold to the outlet of each plug.

2. A method of making an injection molding manifold as claimed in claim 1 wherein the brazing hole in each plug is drilled radially inward from the cylindrical outer surface.

3. A method of making an injection molding manifold as claimed in claim 2 wherein the brazing hole in each plug is drilled substantially midway along the plug.

4. A method of making an injection molding manifold as claimed in claim 3 wherein the tool engagement opening made in the outer end of each plug is a slot.

* * * * *